No. 655,990. Patented Aug. 14, 1900.
J. PRINCE.
BILLIARD CUE TIP.
(Application filed Jan. 15, 1900.)
(No Model.)

Witnesses:
Charles F. Logan
J. J. Daly

Inventor:
Jerome Prince,
by
Atty.

THE NORRIS PETERS CO., PHOTO-LITHO., WASHINGTON, D. C.

UNITED STATES PATENT OFFICE.

JEROME PRINCE, OF MILFORD, MASSACHUSETTS, ASSIGNOR TO SARAH J. BUCKLIN, OF ANDOVER, MASSACHUSETTS.

BILLIARD-CUE TIP.

SPECIFICATION forming part of Letters Patent No. 655,990, dated August 14, 1900.

Application filed January 15, 1900. Serial No. 1,430. (No model.)

*To all whom it may concern:*

Be it known that I, JEROME PRINCE, of Milford, in the county of Worcester and State of Massachusetts, have invented certain new and useful Improvements in Billiard-Cue Tips, of which the following is a specification.

The object of my invention is to provide for billiard-cues an improved tip formed of material or composition which will not require to be chalked when in use, but at the same time is not liable to slip on the billiard-ball when the player is making a shot.

My improved cue-tip is composed of india-rubber, gum, asbestos, and chalk compounded together in about equal proportions, molded into proper shape and size, and cured or vulcanized, so as to keep its shape and be slightly elastic. For this purpose a trace of sulfur is added to the composition. I prefer to embed in this tip the head of a screw or a corrugated nail, the body of which will enter the cue axially and secure the tip in place; but the tip may be cemented on or otherwise secured.

The ingredients of which my cue-tip is composed are of such a nature that they can be incorporated in one composite substance of much durability, and especially adapted for the peculiar service designed. The fibrous charactor of the asbestos counteracts any tendency to crumble which the chalk might impart, and thus proper cohesion is secured, while the chalk prevents slipping.

In compounding the mass from which the tips are formed the gum will be cut with benzin or any proper solvent, and the other materials, pulverized or thoroughly disintegrated, will be added and intimately intermixed therewith to form a plastic substance capable of being molded and properly hardened.

Figure 1:
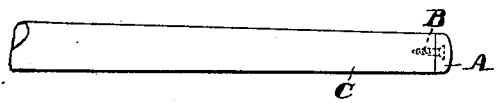
Figure 2:
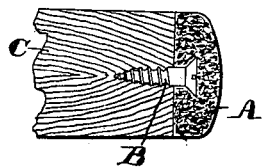

In the drawings, Figure 1 represents one of my improved cue-tips; and Fig. 2 is a view in section showing the tip secured to the cue by a nail or screw the head of which is embedded in the tip, A representing the tip, B the fastener, and C the end of the cue.

I claim as my invention—

1. The composite cue-tip described, consisting of rubber gum, asbestos and chalk, intermixed and compounded together and suitably hardened, substantially as set forth.

2. The described tip for billiard-cues, such tip being compounded of rubber gum, asbestos and chalk in about equal proportions, molded to proper shape and cured to retain its form, substantially as set forth.

In testimony whereof I have affixed my signature in presence of two witnesses.

JEROME PRINCE.

Witnesses:
 A. H. SPENCER,
 H. F. O'BRIEN.